(12) United States Patent
Engel et al.

(10) Patent No.: US 10,356,106 B2
(45) Date of Patent: Jul. 16, 2019

(54) DETECTING ANOMALY ACTION WITHIN A COMPUTER NETWORK

(71) Applicant: Palo Alto Networks (Israel Analytics) Ltd, Tel Aviv (IL)

(72) Inventors: Giora Engel, Mevaseret Zion (IL); Michael Mumcuoglu, Jerusalem (IL)

(73) Assignee: PALO ALTO NETWORKS (ISRAEL ANALYTICS) LTD., Tel Aviv (IL)

( * ) Notice: Subject to any disclaimer, the term of this patent is extended or adjusted under 35 U.S.C. 154(b) by 0 days.

(21) Appl. No.: 15/075,343

(22) Filed: Mar. 21, 2016

(65) Prior Publication Data

US 2016/0234167 A1    Aug. 11, 2016

Related U.S. Application Data

(63) Continuation-in-part of application No. 14/234,165, filed as application No. PCT/IL2012/050272 on Jul. 25, 2012, now abandoned.
(Continued)

(51) Int. Cl.
*G06F 11/00* (2006.01)
*G06F 12/14* (2006.01)
(Continued)

(52) U.S. Cl.
CPC ........ *H04L 63/1408* (2013.01); *H04L 43/106* (2013.01)

(58) Field of Classification Search
CPC ..................... H04L 63/1408; H04L 63/1425; H04L 43/106
See application file for complete search history.

(56) References Cited

U.S. PATENT DOCUMENTS 5,991,881 A    11/1999   Conklin et al.
7,178,164 B1    2/2007   Bonnes
(Continued)

FOREIGN PATENT DOCUMENTS

EP    0952521 A2    10/1999
WO    03083660 A1   10/2003

OTHER PUBLICATIONS

Bilge et at., "Disclosure: Detecting Botnet Command and Control Servers Through Large-Scale NetFlow Analysis", ACSAC, 10 Pages, Dec. 3-7, 2012.
(Continued)

*Primary Examiner* — Trong H Nguyen
*Assistant Examiner* — Amie C. Lin
(74) *Attorney, Agent, or Firm* — Kligler & Associates

(57) ABSTRACT

A method for network monitoring includes intercepting, in an anomaly detection module, a first data packet transmitted over a network in accordance with a predefined protocol to or from an entity on the network. Both a network address that is assigned to the entity and a strong identity, which is incorporated in the first data packet in accordance with the predefined protocol, of the entity are extracted from the intercepted first data packet. An association is recorded between the network address and the strong identity. Second data packets transmitted over the network are intercepted, containing the network address. Responsively to the recorded association and the network address, the second data packets are associated with the strong identity. The associated second data packets are analyzed in order to detect anomalous behavior and to attribute the anomalous behavior to the entity.

32 Claims, 10 Drawing Sheets

Related U.S. Application Data

(60) Provisional application No. 61/511,568, filed on Jul. 26, 2011, provisional application No. 61/543,356, filed on Oct. 5, 2011.

(51) Int. Cl.
*G06F 12/16* (2006.01)
*G08B 23/00* (2006.01)
*H04L 29/06* (2006.01)
*H04L 12/26* (2006.01)

(56) References Cited

U.S. PATENT DOCUMENTS

| | | |
|---|---|---|
| 7,181,769 B1 | 2/2007 | Keanini et al. |
| 7,523,016 B1 | 4/2009 | Surdulescu et al. |
| 7,694,150 B1 | 4/2010 | Kirby |
| 7,703,138 B2 | 4/2010 | Desai et al. |
| 8,245,304 B1 | 8/2012 | Chen et al. |
| 8,429,180 B1 | 4/2013 | Sobel et al. |
| 8,490,190 B1* | 7/2013 | Hernacki ............ H04L 63/1425 726/23 |
| 8,555,388 B1 | 10/2013 | Wang et al. |
| 8,607,353 B2 | 12/2013 | Rippert et al. |
| 8,620,942 B1* | 12/2013 | Hoffman ............. G06Q 10/107 707/766 |
| 8,677,487 B2 | 3/2014 | Balupari et al. |
| 8,762,288 B2* | 6/2014 | Dill ...................... G06Q 30/02 705/325 |
| 8,925,095 B2 | 12/2014 | Herz et al. |
| 8,966,625 B1 | 2/2015 | Zuk et al. |
| 9,038,178 B1 | 5/2015 | Lin |
| 9,147,071 B2 | 9/2015 | Sallam |
| 9,231,962 B1 | 1/2016 | Yen et al. |
| 9,342,691 B2 | 5/2016 | Maestas |
| 9,378,361 B1 | 6/2016 | Yen et al. |
| 9,386,028 B2 | 7/2016 | Altman |
| 9,531,614 B1 | 12/2016 | Nataraj et al. |
| 9,736,251 B1* | 8/2017 | Samant ................ H04L 67/22 |
| 10,148,690 B2 | 12/2018 | Shen et al. |
| 2003/0110396 A1 | 6/2003 | Lewis et al. |
| 2004/0250169 A1 | 12/2004 | Takemori et al. |
| 2004/0260733 A1 | 12/2004 | Adelstein et al. |
| 2005/0128989 A1* | 6/2005 | Bhagwat ................ H04K 3/65 370/338 |
| 2005/0216749 A1 | 9/2005 | Brent et al. |
| 2005/0262560 A1 | 11/2005 | Gassoway |
| 2005/0268112 A1 | 12/2005 | Wang et al. |
| 2006/0018466 A1 | 1/2006 | Adelstein et al. |
| 2006/0075462 A1 | 4/2006 | Golan |
| 2006/0075500 A1 | 4/2006 | Bertman et al. |
| 2006/0107321 A1 | 5/2006 | Tzadikario et al. |
| 2006/0136720 A1 | 6/2006 | Armstrong et al. |
| 2006/0149848 A1* | 7/2006 | Shay .................. H04L 12/2602 709/229 |
| 2006/0161984 A1 | 7/2006 | Phillips et al. |
| 2006/0242694 A1 | 10/2006 | Gold et al. |
| 2007/0198603 A1 | 8/2007 | Tsioutsiouliklis et al. |
| 2007/0226802 A1 | 9/2007 | Gopalan et al. |
| 2007/0245420 A1* | 10/2007 | Yong .................... H04L 41/28 726/23 |
| 2007/0255724 A1 | 11/2007 | Jung et al. |
| 2007/0283166 A1 | 12/2007 | Yami et al. |
| 2008/0005782 A1 | 1/2008 | Aziz |
| 2008/0016570 A1 | 1/2008 | Capalik |
| 2008/0104046 A1* | 5/2008 | Singla ............... G06F 17/30333 |
| 2008/0134296 A1* | 6/2008 | Amitai ................ H04L 63/102 726/4 |
| 2008/0148381 A1 | 6/2008 | Aaron |
| 2008/0256622 A1 | 10/2008 | Neystadt et al. |
| 2008/0285464 A1* | 11/2008 | Katzir ................ H04L 63/1408 370/241 |
| 2009/0007100 A1 | 1/2009 | Field et al. |
| 2009/0115570 A1 | 5/2009 | Cusack et al. |
| 2009/0157574 A1 | 6/2009 | Lee |
| 2009/0164522 A1 | 6/2009 | Fahey |
| 2009/0193103 A1* | 7/2009 | Small .................... H04L 12/462 709/221 |
| 2009/0320136 A1 | 12/2009 | Lambert et al. |
| 2010/0054241 A1 | 3/2010 | Shah et al. |
| 2010/0071063 A1 | 3/2010 | Wang et al. |
| 2010/0197318 A1* | 8/2010 | Petersen ................ G06Q 10/10 455/456.1 |
| 2010/0212013 A1 | 8/2010 | Kim et al. |
| 2010/0268818 A1 | 10/2010 | Richmond et al. |
| 2010/0278054 A1* | 11/2010 | Dighe .................... H04L 12/26 370/252 |
| 2010/0299430 A1 | 11/2010 | Powers et al. |
| 2011/0026521 A1 | 2/2011 | Gamage et al. |
| 2011/0087779 A1 | 4/2011 | Martin et al. |
| 2011/0125770 A1* | 5/2011 | Battestini ............... G06Q 10/00 707/758 |
| 2011/0153748 A1 | 6/2011 | Lee et al. |
| 2011/0185055 A1* | 7/2011 | Nappier .............. H04L 63/1433 709/224 |
| 2011/0247071 A1 | 10/2011 | Hooks et al. |
| 2011/0270957 A1 | 11/2011 | Phan et al. |
| 2012/0042060 A1* | 2/2012 | Jackowski .......... H04L 47/2475 709/224 |
| 2012/0079596 A1 | 3/2012 | Thomas et al. |
| 2012/0102359 A1 | 4/2012 | Hooks |
| 2012/0136802 A1 | 5/2012 | McQuade et al. |
| 2012/0137342 A1 | 5/2012 | Hartrell et al. |
| 2012/0143650 A1 | 6/2012 | Crowley et al. |
| 2012/0158626 A1 | 6/2012 | Zhu et al. |
| 2012/0191660 A1 | 7/2012 | Hoog |
| 2012/0222120 A1 | 8/2012 | Rim et al. |
| 2012/0233311 A1 | 9/2012 | Parker et al. |
| 2012/0275505 A1 | 11/2012 | Tzannes et al. |
| 2012/0331553 A1 | 12/2012 | Aziz et al. |
| 2013/0031037 A1 | 1/2013 | Brandt et al. |
| 2013/0031600 A1 | 1/2013 | Luna et al. |
| 2013/0083700 A1 | 4/2013 | Sindhu et al. |
| 2013/0097706 A1 | 4/2013 | Titonis et al. |
| 2013/0111211 A1 | 5/2013 | Winslow et al. |
| 2013/0196549 A1 | 8/2013 | Sorani |
| 2013/0298237 A1 | 11/2013 | Smith |
| 2013/0298243 A1 | 11/2013 | Kumar et al. |
| 2013/0333041 A1 | 12/2013 | Christodorescu et al. |
| 2014/0007238 A1 | 1/2014 | Magee et al. |
| 2014/0013434 A1 | 1/2014 | Ranum et al. |
| 2014/0325643 A1 | 10/2014 | Bart et al. |
| 2015/0040219 A1 | 2/2015 | Garraway et al. |
| 2015/0047032 A1 | 2/2015 | Hannis et al. |
| 2015/0071308 A1 | 3/2015 | Webb et al. |
| 2015/0121461 A1 | 4/2015 | Dulkin et al. |
| 2015/0195300 A1 | 7/2015 | Adjaoute |
| 2015/0264069 A1 | 9/2015 | Beauchesne et al. |
| 2015/0304346 A1 | 10/2015 | Kim |
| 2016/0150004 A1 | 5/2016 | Hentunen |
| 2016/0191918 A1 | 6/2016 | Lai et al. |
| 2016/0315954 A1 | 10/2016 | Peterson et al. |
| 2016/0352772 A1 | 12/2016 | O'Connor |
| 2017/0041333 A1 | 2/2017 | Mahjoub et al. |
| 2018/0288073 A1 | 10/2018 | Hopper |
| 2019/0007440 A1 | 1/2019 | Lavi et al. |

OTHER PUBLICATIONS

Blum., "Combining Labeled and Unlabeled Data with Co-Training", Carnegie Mellon University, Research Showcase @ CMU, Computer Science Department, 11 pages, Jul. 1998.

Felegyhazi et al., "On the Potential of Proactive Domain Blacklisting", LEET'10 Proceedings of the 3rd USENIX Conference on Large-scale exploits and emergent threats, 8 pages, San Jose, USA, Apr. 27, 2010.

Frosch., "Mining DNS-related Data for Suspicious Features", Ruhr Universitat Bochum, Master'sThesis, 88 pages, Dec. 23, 2011.

Bilge at al., "Exposure: Finding Malicious Domains Using Passive DNS Analysis ", NDSS Symposium, 17 pages, Feb. 6-9, 2011.

(56) References Cited

OTHER PUBLICATIONS

Gross et al., "FIRE: FInding Rogue nEtworks", Annual Conference on Computer Security Applications (ACSAC'09), 10 pages, Dec. 7-11, 2009.
Markowitz, N., "Bullet Proof Hosting: A Theoretical Model", Security Week, 5 pages, Jun. 29, 2010, downloaded from http://www.infosecisland.com/blogview/4487-Bullet-Proof-Hosting-A-Theoretical-Model.html.
Konte et al., "ASwatch: An AS Reputation System to Expose Bulletproof Hosting ASes", SIGCOMM, pp. 625-638, Aug. 17-21, 2015.
Markowitz, N., "Patterns of Use and Abuse with IP Addresses", Security Week, 4 pages, Jul. 10, 2010, downloaded from http://infosecisland.com/blogview/5068-Patterns-of-Use-and-Abuse-with-IP-Addresses.html.
Wei et al., "Identifying New Spam Domains by Hosting IPs: Improving Domain Blacklisting", Department of Computer and Information Sciences, University of Alabama at Birmingham, USA, 8 pages, Dec. 8, 2010.
Goncharov, M., "Criminal Hideouts for Lease: Bulletproof Hosting Services", Forward-Looking Threat Research (FTR) Team, A TrendLabsSM Research Paper, 28 pages, Jul. 3, 2015.
European Application # 16167582.2 Search Report dated Aug. 2, 2016.
U.S. Appl. No. 14/758,966 Office Action dated Oct. 26, 2016.
European Application # 14741051.8 Search Report dated Jul. 15, 2016.
U.S. Appl. No. 14/758,966 Office Action dated May 19, 2017.
Niksun, "Network Intrusion Forensic System (NIFS) for Intrusion Detection and Advanced Post Incident Forensics", Whitepaper, 12 pages, Feb. 15, 2010.
U.S. Appl. No. 15/286,674 Office Action dated Apr. 12, 2017.
U.S. Appl. No. 15/286,643 Office Action dated Mar. 17, 2017.
U.S. Appl. No. 14/726,539 Office Action dated Jan. 26, 2017.
Shulman, A., "Top Ten Database Security Threats How to Mitigate the Most Significant Database Vulnerabilities", White Paper, 14 pages, year 2006.
U.S. Appl. No. 14/758,966 Office Action dated Oct. 17, 2017.
U.S. Appl. No. 15/286,643 Office Action dated Sep. 25, 2017.
European application # 17157737.2 search report dated Aug. 21, 2017.
European Application # 12817760.7 office action dated Feb. 5, 2018.

* cited by examiner

| | |
|---|---|
| 300 | Condenser module activity |
| 310 | receiving raw data from all types of sensors which are connected to a computer network |
| 315 | eliminating duplications |
| 320 | analyzing logs to extract relevant computer network action related data |
| 325 | parsing and analyzing the raw data to extract and classify relevant meta-data and identified computer network action |
| 330 | buffering or storing relevant meta-data in a structured format |

Figure 3

400 — Association module activity by utilizing meta-data from the condenser module 410 — analyzing computer network actions for identifying the entities and their relations 415 — associate each computer network action with the involved entities of network action 420 — correlating between different computer network actions and an identified associated entity 425 — querying components in the computer network (directory service) to receive relevant information for identifying entities 430 — associating collected data to entities that are outside the computer network

Figure 4

| 500 | Statistical modeling module activity |
|---|---|
| 510 | receiving detailed entities actions related data including identity of entity over time |
| 515 | clustering entities based on their activities by identifying common characteristics for improving false positive identification according to the statistics of protocol and entities usage for each entity (optional) |
| 520 | continuously learning entities behavior patterns of actions over time and sequence action |
| 525 | continuously learning entities behavior patterns of actions and sequence of actions in multiple time periods |
| 530 | creating connectivity graph (logical/physical/protocol) between user entities for identifying functionality of entities and or analyzing abnormal connectivity |

Figure 5

700 — Decision engine activity

710 — receiving specific information on anomalies in the computer network

715 — creating incidents by aggregating and clustering related anomalies based on specified parameters 720 — analyzing and ranking the incidents 725 — collecting assisting information from people, software agent for determining the ranking and severity of incidents 730 — generating alerts/notification according to generated incidents (identified patterns of attacks) taking into account company policy and predefined rules and assisting information 735 — receiving feedback from a user regarding the alert 740 — updating the models of entities and models of clusters of users according the feedback from the entities 745 — generating automatic context based description of alerts which clarifies alerts context using Natural Language Generation

Figure 7

DETECTING ANOMALY ACTION WITHIN A COMPUTER NETWORK

CROSS-REFERENCE TO RELATED APPLICATIONS

This application is a continuation-in-part of U.S. patent application Ser. No. 14/234,165, filed Jan. 22, 2014, in the national phase of PCT Patent Application PCT/IL2012/050272, filed Jul. 25, 2012, which claims the benefit of U.S. Provisional Patent Application 61/511,568, filed Jul. 26, 2011, and of U.S. Provisional Patent Application 61/543,356, filed on Oct. 5, 2011. All of these related applications are incorporated herein by reference.

FIELD OF THE INVENTION

The present invention relates generally to the field of cyber security and more particularly to detection of anomaly action within a computer network.

BACKGROUND

A variety of techniques and tools are available to aid computer system operators in detecting threats due to attackers and malicious software. For example, U.S. Patent Application Publication 2008/0271143 describes methods for insider threat detection. Embodiments detect insiders who act on documents and/or files to which they have access but whose activity is inappropriate or uncharacteristic of them based on their identity, past activity, and/or organizational context. Embodiments work by monitoring the network to detect network activity associated with a set of network protocols; processing the detected activity to generate information-use events; generating contextual information associated with users of the network; and processing the information-use events based on the generated contextual information to generate alerts and threat scores for users of the network.

SUMMARY

Embodiments of the present invention that are described hereinbelow provide methods, systems and computer software products that are useful in tracking activity within a computer network.

There is therefore provided, in accordance with an embodiment of the invention, a method for network monitoring, which includes intercepting, in an anomaly detection module, a first data packet transmitted over a network in accordance with a predefined protocol to or from an entity on the network. Both a network address that is assigned to the entity and a strong identity, which is incorporated in the first data packet in accordance with the predefined protocol, of the entity are extracted from the intercepted first data packet. An association between the network address and the strong identity is recorded in the anomaly detection module. Second data packets transmitted over the network and containing the network address are intercepted in the anomaly detection module. Responsively to the recorded association and the network address, the second data packets are associated with the strong identity. The associated second data packets are analyzed in order to detect anomalous behavior and to attribute the anomalous behavior to the entity.

In one embodiment, the entity is a host computer, and the strong identity is a hostname of the host computer. Additionally or alternatively, the entity is a user of a computer on the network, and the strong identity is a username of the user.

In some embodiments, the network address is dynamically allocated to the entity, and recording the association includes detecting a change in allocation of the network address, and updating the record responsively to the change. In one embodiment, the method includes intercepting and associating third data packets with the strong identity responsively to the updated record, and analyzing the third data packets together with the second data packets in order to detect and attribute the anomalous behavior to the entity.

In a disclosed embodiment, extracting the strong identity includes identifying the protocol and parsing a payload of the intercepted first data packet responsively to the protocol in order to extract the strong identity. The protocol may be selected from a group of protocols consisting of a network address assignment protocol; a network address advertisement and discovery protocol; a network diagnosis and error reporting protocol; a name registration protocol; an authentication protocol; and a remote access protocol.

In some embodiments, recording the association includes assigning a confidence level to the association, and associating the second data packets with the strong identity includes deciding whether to attribute the second data packets to the entity responsively to the confidence level. In a disclosed embodiment, recording the association includes applying a timestamp to the association, and assigning the confidence level includes reducing the confidence level in response to time that has elapsed since the timestamp.

Additionally or alternatively, invalidating the recorded association in response to an expiration criterion. In a disclosed embodiment, analyzing the associated second data packets includes, upon occurrence of the expiration criterion, retroactively disassociating one or more of the second data packets that were associated with the strong identity during a predefined period prior to the occurrence of the expiration condition.

In some embodiments, extracting the network address and the strong identity, includes deriving from one packet an association between an Internet Protocol (IP) address and a Media Access Control (MAC) address and deriving from another packet an association between the MAC address and a hostname, and recording the association includes associating the IP address with the hostname.

There is also provided, in accordance with an embodiment of the invention, network monitoring apparatus, including a sensor, which is coupled to intercept a first data packet transmitted over a network in accordance with a predefined protocol to or from an entity on the network and to intercept second data packets transmitted over the network. The apparatus includes a memory and a processor, which is configured to extract from the intercepted first data packet both a network address that is assigned to the entity and a strong identity, which is incorporated in the first data packet in accordance with the predefined protocol, of the entity, and to record in the memory an association between the network address and the strong identity. The processor is configured, when the intercepted second data packets contain the network address, to associate the second data packets with the strong identity responsively to the recorded association and the network address, and to analyze the associated second data packets in order to detect anomalous behavior and to attribute the anomalous behavior to the entity.

There is additionally provided, in accordance with an embodiment of the invention, a computer software product, including a computer-readable medium in which program instructions are stored, which instructions, when read by a computer, cause the computer to intercept a first data packet transmitted over a network in accordance with a predefined protocol to or from an entity on the network, to extract from the intercepted first data packet both a network address that is assigned to the entity and a strong identity, which is incorporated in the first data packet in accordance with the predefined protocol, of the entity, and to record an association between the network address and the strong identity. The instructions further cause the computer to intercept second data packets transmitted over the network and containing the network address, to associate, responsively to the recorded association and the network address, the second data packets with the strong identity, and to analyze the associated second data packets in order to detect anomalous behavior and to attribute the anomalous behavior to the entity.

The present invention will be more fully understood from the following detailed description of the embodiments thereof, taken together with the drawings in which:

BRIEF DESCRIPTION OF THE DRAWINGS

FIG. 3 illustrates activity of a condenser module, according to some embodiments of the present invention;

FIG. 4 illustrates an identification module activity by utilizing meta-data from the condenser, according to one embodiment of the present invention;

FIG. 5 illustrates a statistical modeling module activity, according to some embodiments of the present invention;

FIG. 7 illustrates decision engine module activity, according to some embodiments of the present invention;

DETAILED DESCRIPTION OF EMBODIMENTS

Figure 1:
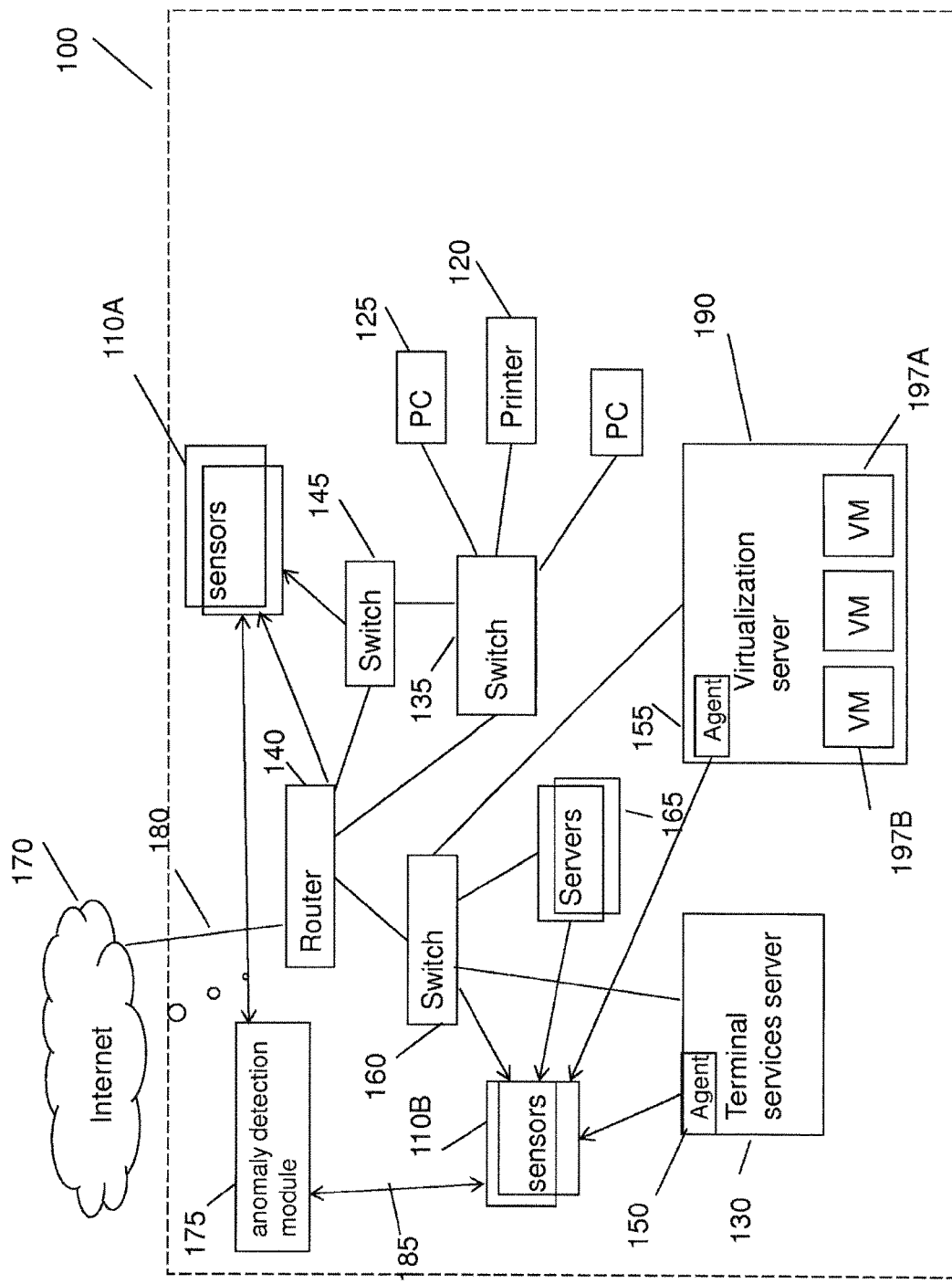
FIG. 1 illustrates a computer network having multiple sensors connected to components, according to some embodiments of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

In cyber-security there are generic attacks which don't target a specific person or organization and targeted attacks. Even a generic malware can evade detection due to many reasons—one of them is the large number of new variants. Even one specific threat can have hundreds of new variants that are not detected by the original rule or signature. In addition, targeted attacks or Advanced Persistent Threats (APT) have changing and complex patterns of behavior that are similar to normal usage of the network and usually evade detection of security systems. APT commonly aims to maintain a long-term access to a target in order to achieve defined objectives.

The present invention, in some embodiments thereof, provides a system for detection of anomaly action and deviation from the normal behavior pattern of the computer network. The anomaly action may be caused by a generic malware of by a more targeted cyber-attack such as APT and may be detected by statistical modeling of the computer network that enables differentiating the anomaly action from the normal behavior.

In the following application the term "entity" relates to users, services, protocols, servers, workstations, mobile devices and network devices.

In the following application the term "flow data" relates to network protocols used to collect Internet Protocol (IP) traffic information such as netflow, a network protocol of Cisco™ Systems, IP Flow Information (IPFIX), sFlow and the like.

In the following application the term "raw data" relates to packets, traffic data, flow data, logs, queries and network protocols.

In the following application the term "Supervisory Control and Data Acquisition (SCAD A)" relates to computer systems that monitor and control industrial, infrastructure, or facility-based processes.

The term "computer network" refers to any computer network such as: Local Area Network (LAN), Wide Area Network (WAN), SCADA and a computer network that uses communication Protocol technology such as IP protocol to share information, operational systems, or computing services within an organization or outside of it.

According to some embodiments of the present invention, there are provided a method and a system for detecting anomaly action within a computer network. The method and system are based on advanced algorithms for collecting data and associating entities in the computer network in order to statistically model an action of a single entity and action of a group of entities.

According to some embodiments of the invention, an anomaly action in the computer network may be identified utilizing the method and system described above and upon identification may generate alerts that specify the nature of threat.

For example, Google™ Inc. as a multinational corporation operates several data centers which are located worldwide may have some of the corporation's assets connected to the internet and as such may be exposed to APT attacks. The corporation's assets may be personal data of clientele, financial data and other classified data on development of products and services. A method and a system that may provide an early detection warning may be advantageous and prevent most of the damage caused by cyber-attacks.

FIG. 1 illustrates a computer network 100 having multiple sensors 110A and HOB (referenced as 110) connected to components of the computer network, according to some embodiments of the present invention.

In a non-limiting example, a computer network of Google™ Inc. may be connected to the internet 170. Sensors 110 may be connected to network devices in the computer network 100 such as: (i) a switch 145 (ii) a router 140; (iii) a virtualization server 190, terminal services sever 130 or other servers 190.

According to some embodiments of the present invention, the sensors 110 may collect data from several places in the computer network 100 and after analysis of the collected data the sensors 110 may send the data to an anomaly detection module 175.

According to some embodiments of the present invention, agents 150 and 155 which are software components may be installed on computers where collection of network data is not possible. For example, communication between multiple Virtual Machines (VMs) 197 that are running on virtualization server 190 is not passing through the physical network and therefore may be monitored and collected by an agent 155. In an another example, when multiple workstations connect to a terminal server 130, an agent 150 may be used to differentiate network communications of different users and associate each user activity to the right user that performed it According to some embodiments of the present invention, as illustrated in FIG. 1, an anomaly detection module 175 may be connected to sensors 110 via the computer network 100 within the organization network or via the Internet.

Figure 2A:
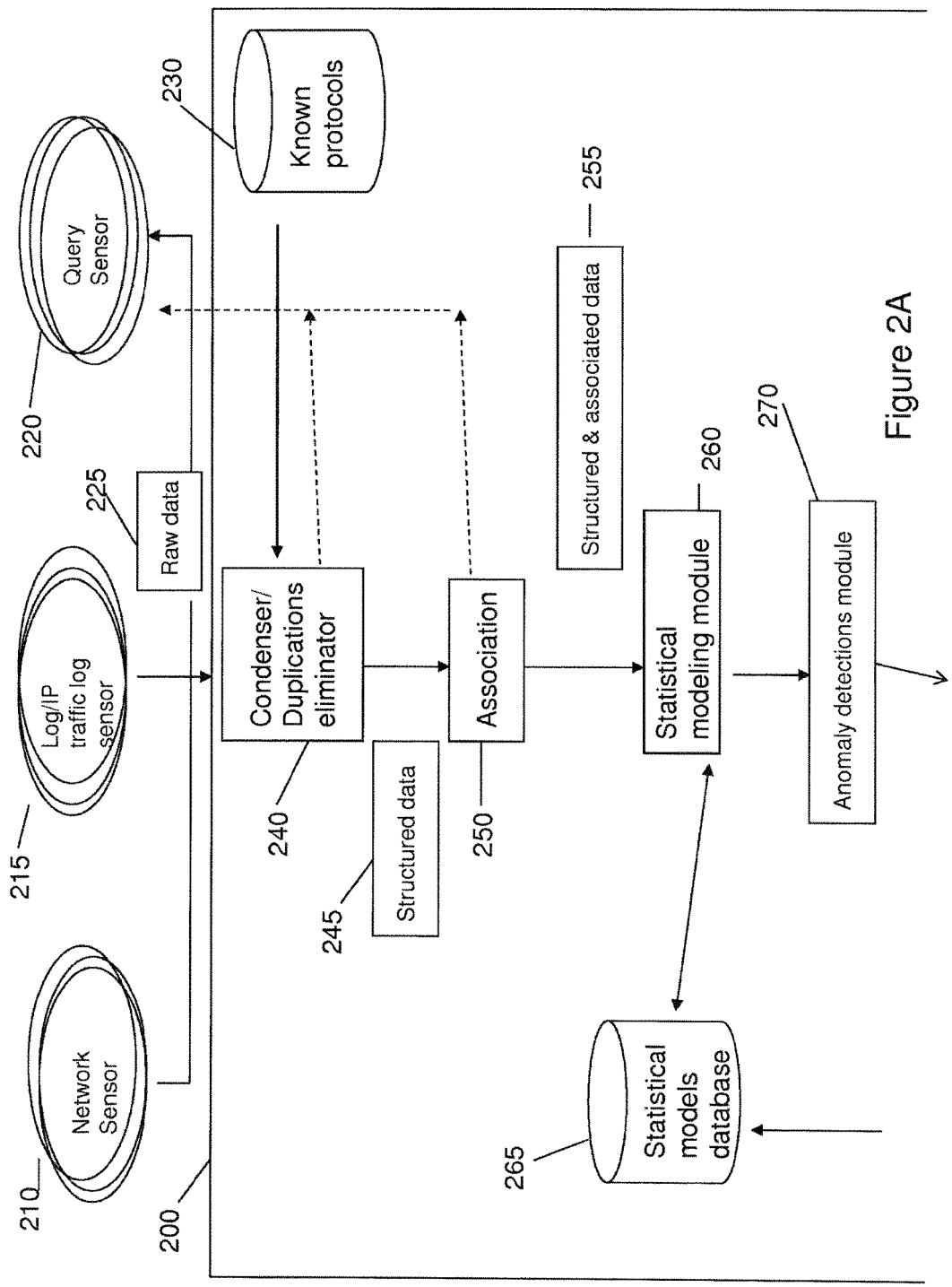
FIG. 2A and FIG. 2B illustrate a system for detecting anomaly action in a computer network, according to some embodiments of the present invention.
Figure 2B:
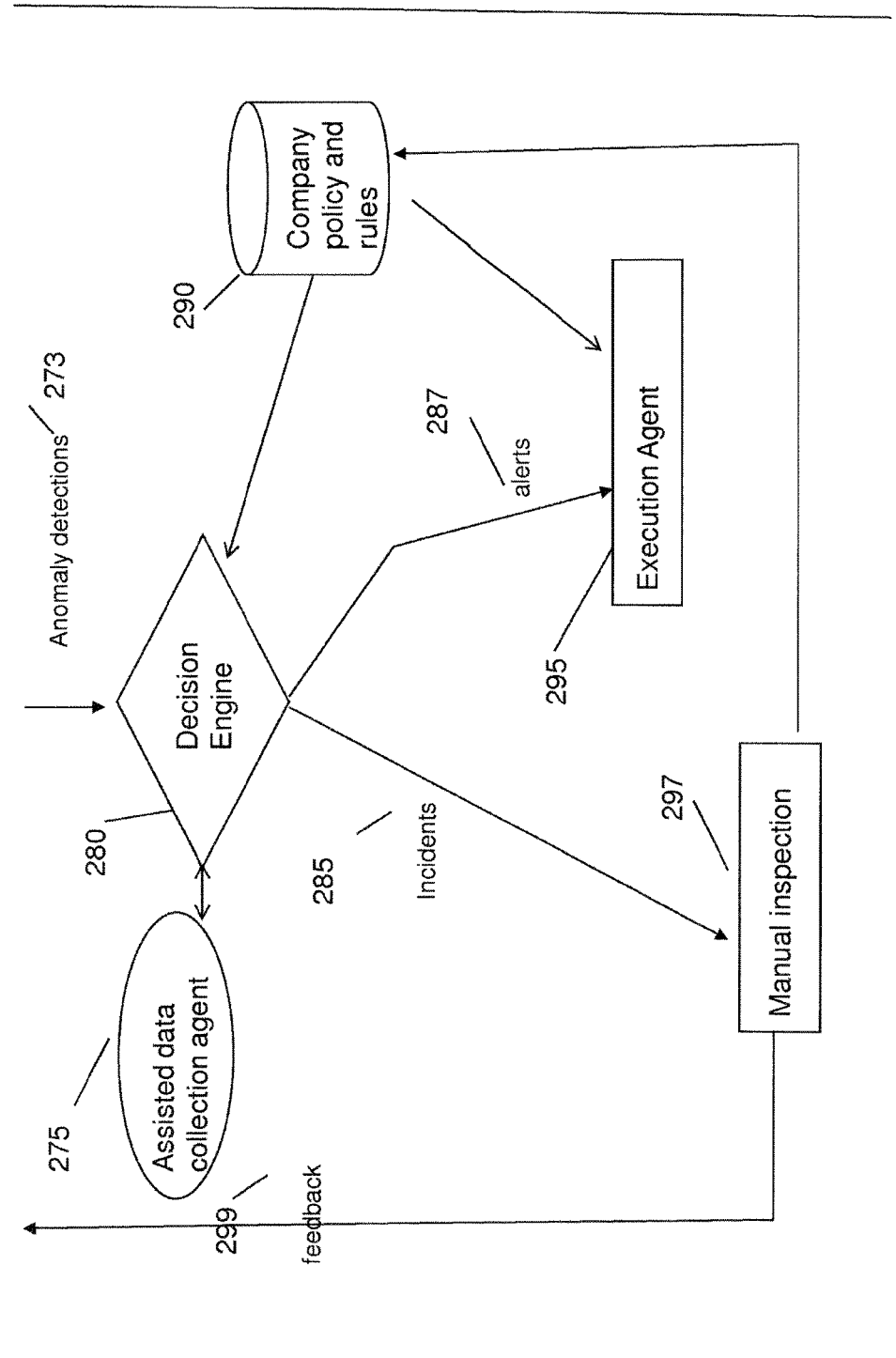

According to other embodiments of the present invention, as illustrated in FIG. 2, a system for detecting anomaly action in a computer network is comprised of an anomaly detection module 200 that is associated to one or more sensors. The sensors may be: multiple network sensors 210, IP traffic log sensors 215 and query sensors 220.

According to other embodiments of the present invention, passive sensors such as network sensors 210 may collect and record network packets from the computer network 100 in FIG. 1. The network sensors 210 may extract relevant data for detecting attacks from the collected data.

According to other embodiments of the present invention, passive sensors such as IP traffic log sensors 215 may collect: (i) flow data from the network devices in the computer network; and (ii) logs from various servers in the computer network. The server may be for example, a file server, an electronic mail server, a server that responds to security authentication requests, a SIEM (security information and event management) system and the like.

According to other embodiments of the present invention, active sensors such as query sensors 220 which may act upon a trigger may run queries on services that are provided by servers and terminals in the computer network and outside the computer network. The purpose of the queries is to gather specific information such as the currently logged-on user name, running processes, the owner of an IP address or a domain and so forth. Query sensors may poll for information periodically and not act upon a trigger. According to other embodiments of the present invention, the anomaly detection module 200 may receive raw data from one or more sensors. For parsing and analyzing the raw data into meta-data based on existing knowledge about each protocol, a condenser and duplication eliminator module 240 in the anomaly detection module 200 may be activated.

The condenser and duplication eliminator module 240 may receive raw data from all sensors in the computer network and may perform de-duplication and processing of the raw data to store only relevant meta-data in a structured format (245). The duplication may occur for example, as result of receiving raw data from different sources in different formats such as: sniffed network packets, IP traffic logs or other log data that represent the same event. Another example of duplication is receiving the same raw data from different locations in the network—for example from a sensor connected to a backbone switch and a sensor connected to another switch.

According to other embodiments of the present invention, the condenser and duplication eliminator module 240 may be comprised of the following components: (i) network protocols analyzer; (ii) logs analyzer; (iii) data flow analyzer; and (iv) duplication eliminator component.

The network analyzer may parse received packets to extract relevant data in a structured format for each action such as: IP addresses, names of files, dates and the like. The log analyzer may extract relevant data from logs. The data flow analyzer may receive various types of formats and extract most relevant information when given only partial data from each format of data flow. Since data is received from multiple sources it is essential to eliminate these duplications to prevent arriving at a wrong conclusion regarding the number of times that an action was performed in the computer network. Eliminating duplications may be performed in two stages: first stage is when packets are received and second stage is in structured format that was extracted by the network analyzer. The second stage is important since data is received from multiple sensors which are located in various locations in the computer network.

According to other embodiments of the present invention, the condenser and duplication eliminator module 240 may transmit structured data (245) regarding actions to an association module 250. The association module 250 may associate the received structured data regarding actions in the computer network to an entity. An entity may be an (Internet Protocol) IP address, a user, a service, a server or a workstation. The structure and operation of associate module 250 are described further hereinbelow with reference to FIGS. 8 and 9.

Association may also be performed for entities that are outside the organization's network. Each entity may be a part of a larger group. For example, an IP address can belong to a subnet, an AS (autonomous system), a domain name, a specific service or a company. Association can be hierarchical.

According to other embodiments of the present invention, the association may be performed by correlating between network actions while the actions are taking place in the computer network or by active queries against various network devices (or services) in the computer network. For example if a user login is detected on a specific workstation it is assumed that all the traffic that originates from it is associated with the user, until he logs out or until another user logs in.

According to other embodiments of the present invention, a statistical modeling module 260 may receive structured data (255) regarding actions with associated entities for continuously building a statistical model of the computer network.

According to other embodiments of the present invention, a model for a group of users may be built over time in addition to modeling per single user. Building a model for a group of users i.e. clustering may divide users into groups by similar properties. During the process of clustering the statistical modeling module 260 may create one or more groups of users that have common properties of action in the computer network regardless of their unit classification. For example, managers may be clustered into the same group instead of clustering a manager with employees of the same business unit.

According to other embodiments of the present invention, there are several types of models: (i) statistical models based on parameters or based on groups of parameters or based on parameter aggregates; (ii) statistical models of association and or connectivity between entities (i.e. users and services)

or between components; and (iii) statistical models of relationships between entities, (iv) models for sequences of actions.

The model may include actions behavior pattern for different time periods in different levels of detail (for example the actions from the last day can be stored as is, from the last month it can be stored in 1 day aggregates, for the last year in 1 month aggregates, etc.) The statistical modeling module 260 is a learning component that works offline i.e. not necessarily when actions are performed in the computer network. Data of the statistical models may be stored in a statistical models database 265.

According to other embodiments of the present invention, the anomaly detection module 270 receives information regarding actions in the computer network and identifies anomalous behavior by comparing actual network actions with the statistical models. The anomalies may be sent to a decision engine 280. The purpose of the decision engine 280 is to aggregate relevant anomalies together and create incidents. The incidents may be reported as notifications 285 regarding anomaly action or an attack activity.

According to some embodiments of the present invention, a training process is performed automatically over multiple time periods, performing statistical analysis of network actions at each period. The training process continues until a statistically significant stabilization of the statistical model is reached. The statistical strength of the model may affect the priority or respective "weight" given to the detected abnormalities.

According to other embodiments of the present invention, at least part of the training process may be performed manually. The notifications 285 may be sent to a manual inspection 297. The manual inspection 297 may determine if an action is false positive or not and the feedback (299) of the manual inspection may be sent to the statistical models database 265.

According to other embodiments of the present invention, the anomalies are identified by one of the following: (i) comparing a single action in the computer network to the statistical model; and (ii) comparing a group of actions in the computer network to the statistical model.

According to other embodiments of the present invention, anomalies can be detected by finding specific entities that differ in their behavior from the majority of other entities in the computer network which have similar functionality, or finding actions that differ from the majority of actions in their characteristics. This method works on a batch of data and detects the anomalies rather than compare a specific action to a model. One example is detecting workstations that connect to many destinations on a certain protocol, while most of the other workstations connect to only a few. This method uses models of behavior that represent a certain timespan (such as a day, a week, a month, etc.) and analyze a bulk of data finding outliers (anomalous actions of entities). Sometimes a single action may not indicate on an anomaly, however the aggregated behavior of the entity may be significant to trigger an anomaly.

According to other embodiments of the present invention, the decision engine 280, may analyze several anomaly actions and generate incidents/alerts based on identified anomalies according to predefined rules such as company policy rules (290) or based on identified anomalies according to identified attack patterns.

The decision engine can use assisted data collection agent 275 for receiving feedback from users before generating an alert.

The incidents/alerts 287 are reported to an execution agent 295 which may apply prevention activities according to company policy and rules 290 for blocking or hindering the suspicious activity. For example suspending a specific entity from using the computer network 100, disconnecting the offending computer from the network, locking user account or blocking specific network traffic.

According to other embodiments of the present invention, a linguistic component may generate a description that will clarify context of alerts.

FIG. 3 illustrates activity of a condenser module, according to some embodiments of the present invention.

According to some embodiments of the present invention, the condenser module may receive information from at least one sensor in the computer network and may perform de-duplication and processing to store only the relevant meta-data in a structured format. The data that was received from at least one sensor may be in raw format such as sniffed network packets or can be IP traffic logs or other log data. The condenser module may analyze specific network protocols and extract relevant metadata.

The activity of the condenser module may begin with receiving raw data from all types of sensors which are connected to a computer network (stage 310). After data is received from at least one sensor the condenser may eliminate duplications (stage 315).

According to some other embodiments of the present invention, the condenser module may analyze logs to extract relevant computer network action related data (stage 320).

According to some other embodiments of the present invention, the condenser module may parse and analyze the raw data that was received from at least one sensor to extract and classify relevant meta-data and identified computer network action (stage 325). The analysis may parse multiple packets which may support one or more network actions. After relevant meta-data is extracted and classified it may be buffered or stored in a structured format (stage 330).

FIG. 4 illustrates an association module activity by utilizing meta-data from the condenser, according to one embodiment of the present invention. The structure of this module and examples of its operation are described further hereinbelow with reference to FIGS. 8 and 9.

According to some other embodiments of the present invention, the association module may identify the entities and their relations (stage 410) based on analyzing computer network actions received from the sensors, such as user logins, address resolutions, configuration and zero-configuration actions, and queries to relevant servers such as directory servers. Some entities are related to other, for example a set of IP addresses in the same subnet, a set of users in the same business unit, etc.

According to some other embodiments of the present invention, the association module may associate each action with the relevant entities involved (stage 415) (i.e., IP addresses, users, services servers or workstations).

For example, accessing a file in the network can be associated to the originating workstation that generated the traffic and to specific user that is logged in on the workstation at the same time. Another example is data that is transferred from the web-server to the database server which is associated with the web application service running on the web server.

According to some other embodiments of the present invention, the association may be hierarchical. For example, a user may be a part of an organizational group, which may be part of a larger group. Another example, is an IP that is a part of a subnet which is a part of an AS which belongs to a company.

The association between network actions and entities can be achieved by the following steps described in steps 420 and 425.

According to some other embodiments of the present invention, association module activity may correlate between different computer network actions occurring in the same session period to identified associated entities (stage 420). For example if a user login action is detected on a specific workstation, it is assumed that all the traffic that originates from the workstation is associated with the logged in user, until the user logs out or until another user logs in. There is time correlation between the login and the other actions that are originated by the workstation.

According to some other embodiments of the present invention, association module activity may actively query components in the computer network (e.g., directory service) to receive relevant information for identifying relevant identities of entities (stage 425). For example query the directory service for the IP address of a server within the computer network to receive information about the server such as name and purpose or the server, or query a computer to get the current logged-in user.

According to some other embodiments of the present invention, the association module may associate collected data to entities that are outside the computer network (stage 430). Each entity may be a part of a larger group.

For example, an IP address may belong to: a subnet, an Autonomous System (AS), a domain name, a specific service (such as Gmail or Facebook) or a company.

FIG. 5 illustrates a statistical modeling activity, according to some embodiments of the present invention.

According to some other embodiments of the present invention, the system may use machine learning algorithms to build a model for each user or service. The statistical model describes the normal behavior in generalized/aggregated terms. The following steps describe the process of generating the statistical models:

Entities usually utilize their credentials in a very minimalistic way. For example, it is a common practice to grant access to more than the specific files that a user uses, but in practice each user uses a very small portion of the resources the user has access to. Another example: theoretically each computer can send packets to all other computer in the network but in practice the number of destinations for each computer is small. The generalization process learns from the actions of the entity and defines the actual resources used by the entity and the pattern of usage (including but not limited to frequency of usage, bandwidth, applicative description of actions performed, etc.)

Each captured packet, IP traffic record i.e. flow data (such as NetFlow) or log record is part of an action. The action may be a TCP session or a logical action (such as a file transfer within an open TCP session, which can be followed by additional actions). Additional packets or records may enrich the information known about the current action and may create a new or sub-action.

The action Meta data is then enriched with the associated entities and their roles. The roles represent the accumulated data the system learned about the entities and their interaction with other entities in the network. Role information is given by an automatic analysis of the network entities according to the characteristics of their associated historical actions within the network. For example, the endpoints in a network can be servers or workstations. The automatic analysis can detect the roles of each endpoint and this information is used by the modeling process as workstations and servers may have different characteristics. Another example of roles is administrative users vs. regular users. The two groups have different behavior in the network.

According to some embodiments of the present invention, statistical modeling module may begin with receiving detailed entities actions related data including identity of entity over time from the association module activity (stage 510). For example, the statistical modeling module 260 in FIG. 2A may receive data over time such as: a user "X" accessed a file on the files' server in a specified time. The data may include parameters such as: size of the file, the file's location in the files' server, name of the file and the like. After processing the received information, the statistical modeling module 260 in FIG. 2A may build a model for the user and a model for a group of users which represent the behavior of the user or group.

According to some embodiments of the present invention, an optional step is clustering entities based on their activities by identifying common characteristics, such clustering improves false positive identification according to the statistics of protocol and entities usage for each entity (stage 515).

For example, managers of units in an organization may be clustered instead of clustering a manager with the manager's subordinate employees working in the same unit. Thus, preventing false-positive identification of anomaly actions by comparing a manager's action in the computer network to other manager's action in the computer network instead of comparing the manager's action in the computer network to the manager's subordinates' employees.

According to some other embodiments of the present invention, the statistical modeling module may be continuously learning entities behavior patterns of actions and sequence of actions over time (stage 520). Many actions are often part of a larger sequence of actions. For example connecting to a VPN includes a few login layers, accessing a file is usually preceded by querying its attributes, etc. Looking at the sequence of actions is sometimes more meaningful than looking at each specific action.

Statistical models may be built over time based on parameters of actions in the computer network or based on groups of parameters of actions in the computer network. The system may continuously receive data and may continuously update the statistical model quantitatively as well as qualitatively. The statistical models may be built by automatically finding statistically strong parameters in the computer network over time, such as schedule, protocol and other connectivity related parameters. The parameters may be found by utilizing machine learning algorithms such as decision trees. For that purpose, the statistical modeling module creation process may correlate sequences of actions (stage 520 or 525) and apply a machine learning algorithm. The leaning algorithm enables identifying statically significant events by, for example, using structured information database such as decisions trees or creating N-dimensional information structures. A parameter can be a quantity or an aggregate of a quantity. For example: volume of traffic, number of different IP addresses accessed, etc. A group of parameters is a tuple of a few parameters that are analyzed together.

Additionally, the statistical modeling module may maintain statistics of protocol and entities usage/pattern behavior over multiple time periods for each entity (stage 525). For example over the last hour, over the last day, last week, last month, or last year. Some changes or anomalies are relevant when something happens in one minute (for example a large number of connections originating from one computer), and other anomalies are relevant in longer timespans (an aggregate number of failed connections to the same server over 1 week). The level of detail can vary between the different time periods to maintain a manageable dataset. For example on a 1-year timespan the average number of connections will be saved for each month and not each specific connection.

In order to build a statistical model for each entity in the computer network over time, protocols and interaction with other entities may be continuously examined to store statistics for each entity. For example, time of protocol usage, duration of usage, amount of usage of each resource and other statistics related to properties of the usage. Specifically connections between entities in the computer network that are found and didn't exist previously add more data to the models.

Since components in the computer network may have several functions, for example, a component may function as a server in certain protocols and as a client in other protocols, an association graph may assist in identifying the function of the components in the computer network. The statistical modeling module learns different types of behavior of servers and of clients in the computer network. For example, a backup server connects to other servers in the computer network while a storage server receives information from other servers in the computer network.

Different types of entities in the computer network may have a relationship with one another, for that purpose, statistical models of relationships between entities may be built over time. For example, in a certain domain may be a number of Internet Protocol (IP) addresses. A specific user may login on a specific terminal station therefore a relationship between the specific user and the Media Access Control (MAC) address of the specific terminal station may be identified. Other examples are relationship between IP address and username or between IP address and a physical port in a switch and the like. A change in one of the described relationships may indicate an anomaly action.

According to some other embodiments of the present invention, analyzing connectivity (logical/physical/protocol) data between user entities may be used for identifying functionality or role of entities and/or for detecting abnormal connectivity (stage 530). Statistical models of association between entities may be built over time by modeling association graphs between different users in the computer network. The association graph may be comprised of: (i) a logical level between users; (ii) a physical level between various components or between servers in the computer network; and (iii) various protocols can be modeled separately, for example, a situation where a backup server communicates with other servers for providing backup services does not imply that all the servers are connected to each other.

The combination of all previous actions, results in a behavior pattern model for each entity and a model for each cluster of entities.

Figure 6:
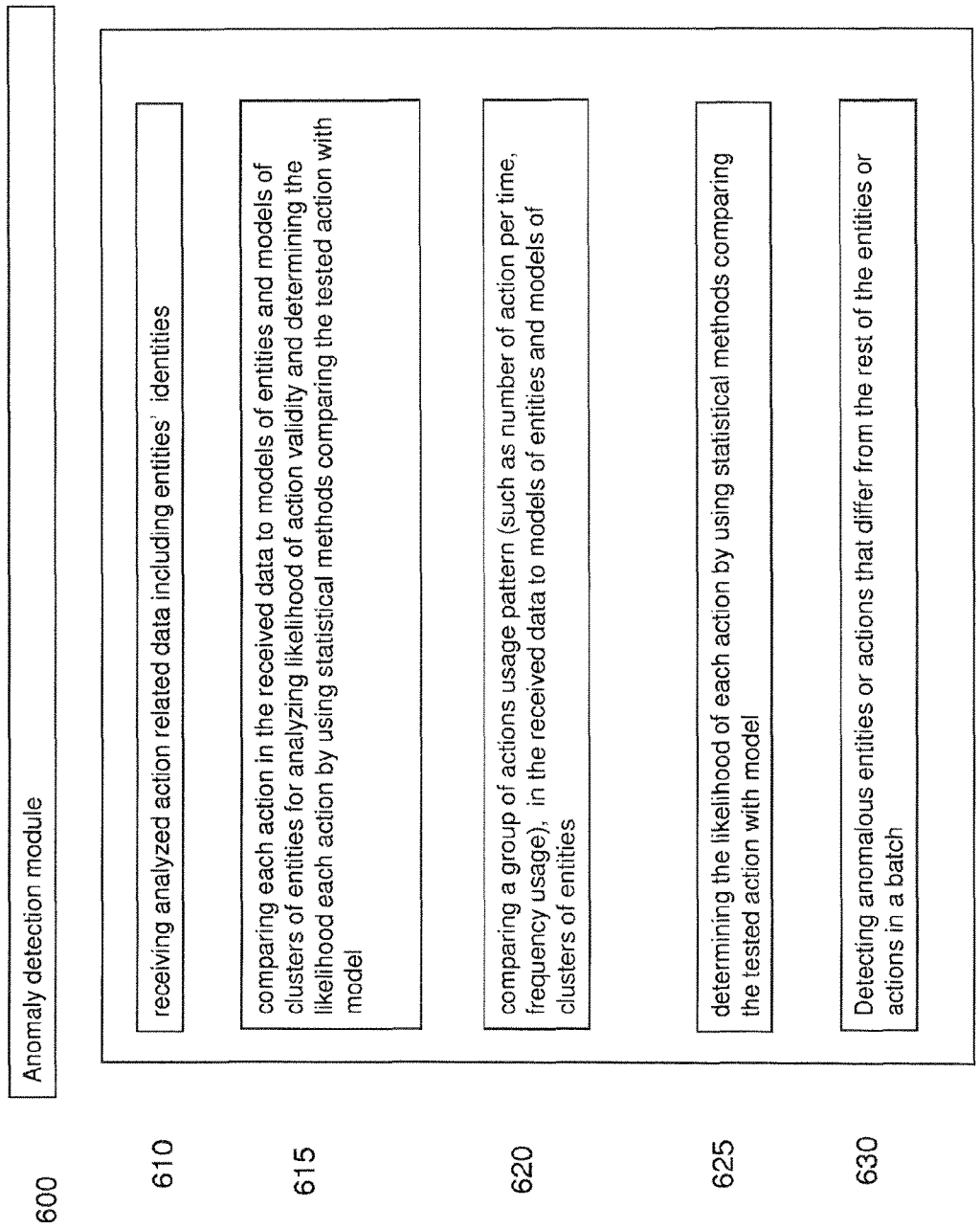
FIG. 6 illustrates an anomaly detection module activity, according to some embodiments of the present invention.

FIG. 6 illustrates an anomaly detection module activity, according to some embodiments of the present invention.

According to some embodiments of the present invention, the anomaly detection module may begin with receiving analyzed action related data including entities' identities (stage 610). Comparing each action in the received data to models of entities and models of clusters of entities for determining the likelihood each action by using statistical methods comparing the tested action with model (stage 615).

For comparing a single action in the computer network to the statistical model, probability may be calculated for each single action in the computer network. For example, identifying outgoing communication that occurred at a time that is not typical to a specific user. Another example may be when a server starts behaving as a workstation i.e. the function of the server is changed. When a new relationship is created in the connectivity graph, a probability of the relationship is calculated by a distance function. In case of detecting a high distance measure of a new created relationship between components, the probability of the new relationship is considered to be low, and therefore it is regarded as suspicious. For example, identifying an action in the computer network where a user logged in to a computer that does not belong to his organizational unit.

Many actions are often part of a larger sequence of actions. For example connecting to a VPN includes a few login layers, accessing a file is usually preceded by querying its attributes, etc. Actions that appear without their contextual sequence may be anomalous and distance measure calculation is applied to quantify the difference from normal behavior.

According to some embodiments of the present invention, the anomaly detection module may compare a group of actions usage pattern (such as number of action per time, frequency usage), in the received data to models of entities and models of clusters of entities (stage 620). For each group of actions quantities parameters may be examined when comparing a group of actions in the computer network to the statistical model. Quantities parameters may be: time elapsed between actions, amount of actions, rate of actions that took place and the like. For example, quantitative identification of a user's access to a thousand files may be identified as an anomalous action when compared to the statistical model in which the user has accessed a maximum of only a dozen files. In this example the anomaly is in the amount of access to files and not each access to a file by itself. Another type of anomaly that can be checked and identified is inconsistency. Anomaly may be detected when identifying changes of relations between entities and/or their types, such as a 1:1 or one-to-many or many-many relation between entities/identities.

For example: A Domain Name System (DNS) name typically corresponds to one or more IP addresses. A physical port typically corresponds to one or more Ethernet addresses. When changes occur in the relations between identities—likelihood is calculated. If there is a low likelihood for the respective action to occur an anomaly may be reported.

According to some other embodiments of the present invention, the anomaly detection module may score the detected anomalies according to their statistical significance.

For each enriched action (action and entities and roles) the anomaly detection module evaluates its characteristics based on the accumulated data extracted so far (packets, protocol decoding, agents, logs, records, etc.) The system may represent the action object as a feature vector in one or more N-dimensional vector spaces. It may use clustering algorithms, non-parametric statistical methods and/or a predefined map of clusters representing green zones, to find the closest known network action in each vector space. Finally, the anomaly detection module calculates a distance metric (represented in terms of probability) for the current action.

The distance measure is used by the anomaly detection module to differentiate normal and anomalous actions. A low distance measure (high probability) indicates a normal behavior. A high distance measure (low probability) indicates an anomalous action (and the degree of the anomaly). Another factor that may affect the determination of anomalous action is the identity and type of entity or its role in the current context such as the role of the entity within the network. For example an action can be considered as routine for an administrative user but anomalous for a business user.

Distance measures work on any comparable feature (dimension) of an action including but not limited to address, size, time, bandwidth, service type, resource path, access type, etc. When an action is identified as anomalous the system identifies the dimensions or features that contribute most to the distance measure. Furthermore multiple anomalies with similar characteristics may be aggregated and grouped together.

According to some other embodiments of the present invention, the anomaly detection module may represent each action in an N dimensional vector and determine the likelihood of each action by using statistical methods including comparing the tested action with the model (stage 625).

According to some other embodiments of the present invention, anomalies can be detected by finding specific entities that differ in their behavior from the majority of other entities in the computer network, or finding actions that differ from the majority of actions in their characteristics and their associated entities (stage 630). This method works on a batch of data and detects the anomalies between entities or actions rather than compare a specific action to a model. One example is detecting workstations that connect to many destinations on a certain protocol, while most of the other workstations connect to only a few. This method uses models of behavior that represent a certain timespan (such as a day, a week, a month, etc.) and analyze a bulk of data finding outliers (anomalous actions of entities). This may be performed by clustering the data and find outliers or small clusters that do not cluster well with the other groups.

FIG. 7 illustrates activity of the decision engine module, according to some embodiments of the present invention.

According to some embodiments of the present invention, the decision engine module receives specific information on anomalies in the computer network (stage 710). Next, the decision engine module may be creating incidents by aggregating and clustering related anomalies based on specified parameters (stage 715) and then analyzing and ranking the incidents (stage 720).

According to some embodiments of the present invention, the decision engine module collects assisting information from people, software agents and/or based on company policy and predefined rules, for determining the ranking and severity of incidents (stage 725).

According to some embodiments of the present invention, assisted False Positive Filtering and Informative Reporting are used in order to reduce the number of false positives generated by the anomaly detection engine. Such reporting may enhance the information included in notifications. For this purpose, a process of collecting augmentative data is performed. This data can be collected in various forms for example by host-based software agents. User feedback may aid to distinct between intended and unintended actions. Interaction with the end-user can be achieved by using different communication methods such as: e-mail, mobile phone notification, SMS/Text, P2P software, instant messenger, etc. The user response (intended/unintended/do not know/etc.) or lack thereof can then be logged, processed and analyzed.

The assisting user can be the user with which the traffic is associated with or an appointed individual. The assisting information can collected from one or more users. Information from software agents can include running processes, currently logged-on-user, open ports, process associated with a given port, and so on. The data can be used in further analysis and to enhance notifications with information that can help the operator quickly make a decision and act upon a given notification. The collected information can be used before a notification is issued, or to provide additional information for a previously issued notification.

According to some embodiments of the present invention, the decision engine module generates alerts/notification about the incidents (identified patterns of attacks) taking into account company policy and predefined rules and assisting information (stage 730).

Upon the alerts, the decision engine module may be receiving feedback from a user regarding the generated alerts (stage 735).

Next, the decision engine module may be updating the models of users and models of clusters of users according the feedback from the user (stage 740). If the feedback suggests that the network activity is benign the decision engine will update the models so that this activity will be considered benign. If the activity is still suspicious or detected as malicious the decision engine may keep the incident open and update it upon receiving new related anomalies or data from the anomaly detection. The decision engine may send alerts/notification upon the update of the incident data.

When an incident is marked as malicious the affected assets (users, workstations, servers, etc.) may be marked as compromised. The priority of compromised assets is elevated and the threshold of the filter is lowered (to enable more subtle anomalies related to the compromised assets to show). Further expansion of the threat is contained, and can be supervised by a human operator.

According to some embodiments of the present invention, the system may use accumulative operator's reactions to past events. These accumulated reactions may trigger the creation of a new user created "green zones". Thresholds within the system are updated continuously based on the operator's feedback.

According to some embodiments of the present invention, the decision engine module may be generating automatic context based description of alerts which clarifies alerts context using Natural Language Generation (NLG) (stage 745).

Figure 8:
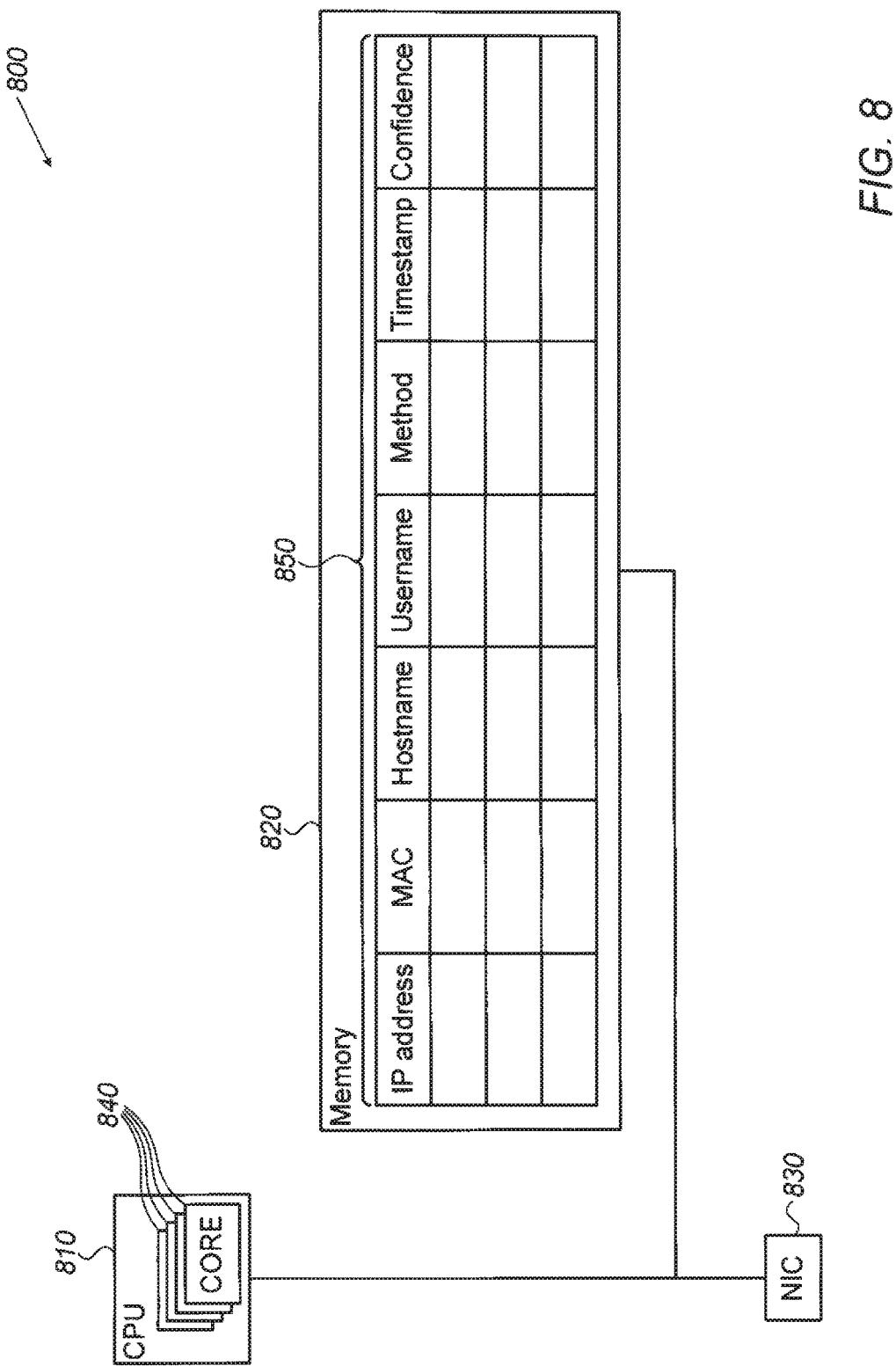
FIG. 8 is a block diagram that schematically illustrates an association server, in accordance with an embodiment of the invention.

FIG. 8 is a block diagram that schematically illustrates an association server 800, in accordance with an embodiment of the invention. Server 800 performs the functions of association module 250 (FIG. 2), and may also perform some or all of the other functions of anomaly detection module 200 that are described above. Typically, server 800 comprises a general-purpose computer, which is programmed in software to carry out the functions that are described herein. This software may be downloaded to the server in electronic form, over a network, for example. Alternatively or additionally, the software may be stored on tangible, non-transitory computer-readable media, such as optical, magnetic or electronic memory media. Further alternatively or additionally, at least some of the functions of server 800 may be implemented in hard-wired or programmable logic circuits.

Server 800 comprises a processor, such as a central processing unit (CPU) 810, and a memory 820, which are connected by a bus to a network interface controller (NIC) 830. NIC 830 connects server 800 to the network that is monitored by the anomaly detection module and, inter alia, to sensors 210, 220, which intercept network traffic for analysis by server 800. (The process of intercepting and analyzing certain kinds of traffic is described in detail hereinbelow with reference to FIG. 9.) CPU 810 typically comprises multiple cores 840, which handle different processing threads in parallel.

CPU 810 stores and updates association data in memory 820, for example in the form of an association table 850. Table 850 may be constructed and stored as a database or as any other suitable type of data structure. The purpose of table 850 is to store identity data in a manner that enables CPU 810 to identify the hostname of the computer and/or the username of the person responsible for transmitting traffic over the network, even when the hostname and username do not appear in the traffic itself.

This sort of association of network activities, such as transmitting and receiving data and accessing various network resource, with strong identities is required for accurate behavioral profiling of such network activities. Identities such as the hostname and username are considered "strong" in the sense that they uniquely and persistently identify the entity responsible for an activity, as opposed to network addresses, such as IP addresses. The term "entity" in this context can refer to any participant in network communications, such as a particular host computer or a particular user of a host computer or other network facilities. Network addresses such as IP addresses are "weak" identifiers, in the sense that they are often allocated dynamically and change over time or even over the route of transmission of a given packet (due to NAT—network address translation—for example).

In most protocols that are used for routine network traffic, such as HTTP, the transmitted packets contain only the IP address and the MAC address within the current subnet (as opposed to the native MAC addresses of the source and destination hosts) and do not reveal any strong identity. By creating, updating, and referring to table 850, however, server 800 is able to ascertain, based on address information in the packet headers, a strong identity of the entities that sent and/or received the traffic. Thus, when the anomaly detection module intercepts data packets that contain a given network address, the module is able to use the associations recorded in table 850 to associate these data packets with the strong identity. When the intercepted data packets are indicative of anomalous behavior, the anomaly detection module can attribute the anomalous behavior to the entity responsible (as indicated by the strong identity), even when the network address used by the entity changes over time.

In the pictured example, records in table 850 are keyed by one or more address fields, including the IP and possibly the MAC address. The hostname field contains the hostname of the computer that has been associated with the IP and/or MAC address, while the username field contains the name of the user who was most recently logged on at this address. In addition, each record may contain the method by which the record was acquired (for example, interception of a DHCP or ARP protocol exchange) and a timestamp indicating the time at which the record was acquired.

A confidence field in each record indicates the degree of reliability of the information that it contains. The confidence is affected, inter alia, by the method of acquisition (since some protocols are more reliable than others in revealing strong identities) and timestamp (since transient identity information, such as IP addresses, is liable to change over time, so that old records are less reliable). CPU 810 uses the confidence values in choosing between different possible associations when records conflict, and may reject or discard a record entirely when the confidence drops below a certain threshold.

Memory 820 typically comprises both RAM and non-volatile memory, such as a magnetic disk. Table 850 is generally held in the RAM for rapid access during system operation and is backed up to non-volatile memory periodically.

In larger networks, multiple servers 800 and corresponding sensors may be deployed, covering different areas of the network. In this case, the servers may share the records in their respective tables 850 in a distributed association process, which improves coverage and acquisition speed. For example, upon creating a new association between identities, CPU 810 may broadcast an association event to the other association servers, which will then update their own records accordingly.

Figure 9:
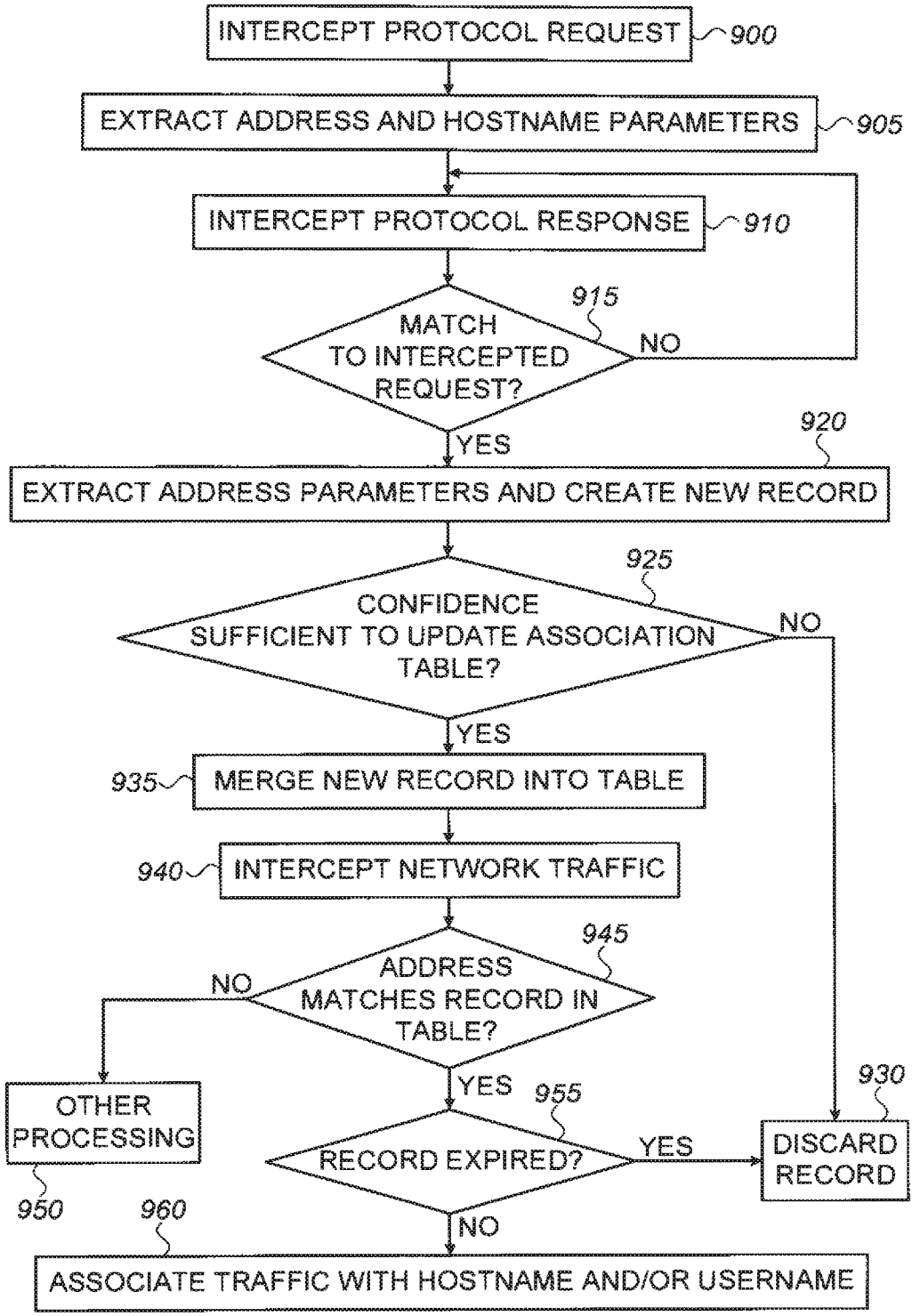
FIG. 9 is a flow chart that schematically illustrates a method for associating network traffic with entities in the network, in accordance with an embodiment of the invention.

FIG. 9 is a flow chart that schematically illustrates a method applied by server 800 for associating network traffic with entities in the network, in accordance with an embodiment of the invention. The method includes two phases: addition of a record to table 850 (steps 900-935) and application of records in processing network traffic (steps 940-960). Although these steps are shown in FIG. 9, for the sake of simplicity, as a linear progression, in practice the two phases generally go on in parallel, with table 850 being updated in parallel with the use of the records in the table for traffic analysis. The two phases may be performed in parallel by different threads running on different cores 840 of CPU 810. Therefore, in the processing phase, the association of given traffic with a strong identity may be briefly delayed in order to ensure that all contemporaneous changes to corresponding records in table 850 have been completed.

The first phase of the method of FIG. 9 is initiated when server 800 intercepts a protocol request that includes identity information, at an interception step 900. For the purposes of the present example, the protocol request will be assumed to be a request issued in accordance with a network address assignment protocol, such as a Dynamic Host Configuration Protocol (DHCP) request, which is issued by a host to a DHCP server in the monitored network to acquire and refresh its IP address. When requesting an IP address, the host advertises its hostname and the MAC address of its network adapter, both of which are strong identities. CPU 810 applies deep packet inspection (DPI) to the DHCP request in order to parse the DHCP payload and thus extract the MAC address and hostname, at an identifier extraction step 905. Server can use these parameters in creating a record in table 850 that associates the MAC address with the hostname, as well as listing the method (DHCP) and time of acquisition and a confidence value.

Server 800 subsequently intercepts a DHCP protocol response, sent by the DHCP server, at a response interception step 910. CPU 810 again applies DPI to the DHCP payload in order to extract the response parameters, including the assigned IP address, along with the MAC address of the host that is to receive the IP address. CPU 810 compares the response parameters to the request that was intercepted at step 900, at a response matching step 915. When a matching response is found, server extracts the assigned IP address, and adds it to the record in table 850, now containing the IP address, MAC address and hostname, at a record creation step 920. Alternatively, the record associating the MAC address with the hostname and the subsequent record associating the IP address with the MAC address are maintained separately.

DHCP thus provides a reliable source of association between IP, MAC addresses and hostnames, for both IPv4 and IPv6. The present method is by no means limited to DHCP, however, and can work with other protocols to extract identity associations. These other protocols include, for example:

Network address advertisement and discovery protocols, such as the Address Resolution Protocol (ARP), which provides association between IP and MAC addresses in both requests and responses.

Network diagnosis and error reporting protocols, such as the Internet Control Message Protocol (ICMPv6), in which neighbor advertisements provide similar information for IPv6.

Name registration protocols, such as NetBIOS, which sometimes contains caller and callee hostnames, and thus provides associations between IP address and hostname.

IPv6 self-assigned link local IP addresses are sometimes an encoded form of the MAC address and thus provide IP/MAC association.

Authentication protocols, such as Kerberos, indicate association between IP address, username, and hostname.

Various server protocols, including DNS, SSL, HTTP and SMTP all provide association between the server hostname and IP address.

Remote access protocols, such as the Remote Desktop Protocol (RDP), which associates the host IP address with the username of the RDP user.

CPU 810 evaluates the confidence level of the new record, at a confidence assessment step 925. The confidence level depends, inter alia, on the method of acquisition of the information, such as the protocol from which the identity information was derived. For example:

Protocols managed centrally by a server, such as DHCP, receive a higher confidence score than peer-to-peer protocols, such as ARP.

Protocols that are easily spoofed receive low confidence scores and may, in some cases, be ignored entirely. (This point is explained further hereinbelow.)

Autonomous and automated protocols receive higher confidence than protocols based on user interaction.

As noted earlier, the confidence level is also a function of time and may drop as the corresponding record ages.

When table 850 already contains one or more records corresponding to the identity parameters of the new record under evaluation, CPU 810 compares the parameters and the confidence levels. When the records match, they can be combined into a single record with greater confidence and merged into table 850, at a table update step 935. In some cases, CPU 810 can combine associations provided by different methods, using association events relating to short-term identities (such as IP addresses) to create a record that associates strong identities. For example, when server 800 intercepts an RDP packet, which associates an IP address with a username, CPU 810 can check whether table 850 already contains a record associating the IP address with a MAC address, possibly derived from a DHCP or ARP packet. In this case, CPU 810 will update the record or create a new record that associates the username with the MAC address.

On the other hand, when records conflict, CPU 810 typically discards the record with lower confidence, at a record discard step 930. Thus, for example, a record based on DHCP association of a hostname with an IP address will be preferred over a conflicting record based on ARP association. In general, when CPU 810 generates a new record giving the only association for a certain identity parameter, it will enter that record in table 850 at step 935. In some cases, however, the confidence in the new record will be so low that even a non-conflicting association will be discarded at step 930.

In this regard, memory 820 may hold a blacklist of types of association events that are known to be unreliable and thus give rise, effectively, to zero confidence in their results. For example:

Cisco routers spoof ARP replies to help misconfigured hosts reach the Internet. When identifying a source MAC address that responds with ARP responses for a large number of IP addresses in multiple subnets, server 800 determines that this sort of spoofing is going on and ignores further ARP responses from this MAC address.

Many VPN clients create a virtual network adapter with a fixed MAC address (unlike real network interfaces that have a unique hardware identifier). When querying hosts connected via VPN, the associated MAC address will be the fixed virtual MAC address instead of the real one. Server 800 observes that the same MAC address is associated with too many hostnames and ignores future associations with that MAC address.

In a similar fashion, server 800 ignores possible associations derived from certain types of traffic and servers. For example, domain controllers forward Kerberos authentications to other domain controllers, and therefore server 800 ignores Kerberos traffic originating from domain controllers, since the actual source of the Kerberos traffic is not known. As another example, hostnames used in HTTP/SSL traffic sent to an internal Web proxy server are ignored, because the true destination IP address is not known.

Continuing on to the second phase of the method of FIG. 9, server 800 (or another component of anomaly detection module 200) intercepts network traffic of possible relevance to anomaly detection, at a traffic interception step 940. CPU 810 checks the packet address, for example the source IP address, against the records in table 850, at a record checking step 945. If no matching record is found, CPU 810 may still process the packet, at an unmatched processing step 950. For example, CPU 810 may simply associate the traffic with an entity representing the IP address, and evaluate any possible anomalies associated with this IP address entity, without tying the analysis to a particular host or user.

If CPU 810 is successful in matching the packet captured at step 940 to a record in table 850, it then checks whether the record has expired, at an expiration checking step 955. Alternatively or additionally, CPU 810 may check for expired records in a separate background process. In either case, when a record expires, it is discarded at step 930 and removed from table 850. As long as the record is still valid, however, CPU 810 uses the record to associate the packet with the hostname and/or username that is indicated by the record found at step 945. CPU 810 analyzes the associated traffic in order to identify anomalous behavior by the host or user, by applying the analysis techniques described in earlier sections of this description.

Various criteria can be applied in deciding when a given record in table 850 should expire relative to its timestamp. For example, when DHCP allocates an IP address to a given host, the allocation will become invalid after a certain "lease time" has expired, unless the host renews the allocation. Thus, when the lease time expires, the association between the IP and MAC addresses indicated by the corresponding record in the table is no longer used, unless server 800 intercepts a DHCP renewal in the interim. (The association between the MAC address and hostname typically remains valid, however.) By the same token, if server 800 intercepts a new allocation for an IP address that is listed in table 850, the existing record containing this IP address will expire immediately. Additionally or alternatively, the confidence of any given record may decrease gradually over time, based on the time that has elapsed since the timestamp of the record. The record will expire when the confidence reaches zero.

In some cases, expiration of a record in table 850 may have retroactive effect on network traffic that was captured previously. In other words, CPU 810 may retroactively disassociate packets that were associated with a certain strong identity during a certain period prior to the occurrence of the expiration condition. This sort of retroactive expiration is useful particularly when relying on associations derived from methods with low reliability, such as protocols involving user actions. As an example, suppose a host advertises its name from time to time (but not regularly), and this advertisement is used as the basis for a record in table 850 associating the hostname as a strong identity with the IP address from which the advertisement originated. When a subsequent association event associates a different hostname with the same IP address, server 800 will generally be unable to ascertain exactly when the change actually occurred. In this case, CPU 810 may clear the associations made previously, at step 960, between intercepted traffic and the earlier hostname for any traffic that was intercepted between the last association event using the earlier hostname and the new association event with the new hostname.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for network monitoring, comprising:
   intercepting, in an anomaly detection module, data packets transmitted over a network;
   extracting from the intercepted data packets, first data packets, each of the first data packets including two or more identities in a manner indicative that the two or more identities represent a same entity, the first data packets including packets of a network address assignment protocol, packets of a network address advertisement and discovery protocol and packets of a network diagnosis and error reporting protocol;
   recording the two or more identities from the each of the first data packets, as identity associations in an association data structure forming associations between network addresses and strong identities;
   assigning confidence levels to the identity associations, responsive to respective protocols from which the identity associations were derived;
   when two or more of the identity associations conflict, choosing to record one of the conflicting identity associations in the association data structure responsive to the confidence levels of the conflicting identity associations;
   identifying in the intercepted data packets, by the anomaly detection module, second data packets transmitted over the network and containing network addresses of the second data packets;
   responsively to the network addresses of the second data packets and the identity associations in the association data structure, associating the second data packets with respective ones of the strong identities; and
   analyzing the second data packets in order to detect anomalous behavior and to attribute the anomalous behavior to the respective ones of the strong identities.

2. The method according to claim 1, wherein the strong identities comprise hostnames of host computers.

3. The method according to claim 1, wherein the strong identities comprise usernames of users of computers.

4. The method according to claim 1, wherein the extracting of the first data packets and the recording of the two or more identities as the identity associations comprises extracting the first data packets involved in allocation of network addresses, and updating the association data structure responsively to the first data packets involved in the allocation of network addresses.

5. The method according to claim 4, and comprising identifying in the intercepted data packets, third data packets that are associated with one of the strong identities responsively to the updated association data structure, and analyzing the third data packets together with the second data packets in order to detect and attribute the anomalous behavior to an entity corresponding to the one of the strong identities.

6. The method according to claim 1, wherein the recording of the two or more identities from the each of the first data packets comprises identifying a protocol for the each of the first data packets, and parsing a payload of the each of the first data packets responsively to the protocol for the each of the first data packets in order to extract the two or more identities from the each of the first data packets.

7. The method according to claim 6, wherein the extracting the first data packets comprises additionally extracting from the intercepted data packets, packets according to
   a name registration protocol;
   an authentication protocol; and
   a remote access protocol.

8. The method according to claim 1, wherein the associating the second data packets with the respective ones of the strong identities comprises deciding whether to attribute the second data packets to a respective entity responsively to a confidence level assigned to a respective association.

9. The method according to claim 8, wherein the recording of the two or more identities as the identity associations comprises applying a timestamp to each identity association of the identity associations, and wherein the assigning the confidence levels comprises reducing the confidence levels in response to time that has elapsed since the timestamp.

10. The method according to claim 1, and comprising invalidating recorded associations in response to an expiration criterion.

11. The method according to claim 10, wherein the analyzing the second data packets comprises, upon occurrence of the expiration criterion, retroactively disassociating one or more of the second data packets that were associated with one of the respective ones of the strong identities during a predefined period prior to the occurrence of the expiration criterion.

12. The method according to claim 1, wherein the recording of the two or more identities from the each of the first data packets comprises deriving from one packet an association between an Internet Protocol (IP) address and a Media Access Control (MAC) address and deriving from another packet an association between the MAC address and a hostname, and wherein the recording the two or more identities from the each of the first data packets, as the identity associations, comprises associating the IP address with the hostname.

13. The method according to claim 1, wherein the recording of the two or more identities from the each of the first data packets comprises additionally recording two or more identities from packets according to a NetBIOS protocol.

14. The method according to claim 1, wherein the recording of the two or more identities from the each of the first data packets comprises additionally recording two or more identities from packets according to a Kerberos protocol.

15. The method according to claim 1, wherein the recording of the two or more identities from the each of the first data packets comprises additionally recording two or more identities from packets according to a remote desktop protocol (RDP).

16. The method according to claim 1, wherein the recording of the two or more identities from the each of the first data packets comprises recording the two or more identities from the each of the first data packets in accordance with Dynamic Host Configuration Protocol (DHCP), address resolution protocol (ARP) and Internet Control Message Protocol (ICMP).

17. The method according to claim 1, wherein the assigning the confidence levels to the identity associations comprises assigning responsively to times of the first data packets.

18. The method according to claim 1, further comprising discarding identity associations having a confidence level below a certain threshold.

19. The method according to claim 1, wherein the choosing to record the one of the conflicting identity associations comprises discarding identity associations conflicting with another identity association, having a higher confidence level.

20. Network monitoring apparatus, comprising:
 a sensor configured to intercept data packets transmitted over a network;
 a memory; and
 a processor, which is configured to extract from the intercepted data packets, first data packets, each of the first data packets including two or more identities in a manner indicative that the two or more identities represent a same entity, the first data packets including packets of a network address assignment protocol, packets of a network address advertisement and discovery protocol and packets of a network diagnosis and error reporting protocol, to record the two or more identities from the each of the first data packets, as identity associations in an association data structure in the memory, wherein the identity associations associate between network addresses and strong identities, to assign confidence levels to the identity associations, responsive to respective protocols from which the identity associations were derived, when two or more of the identity associations conflict, to choose to record one of the conflicting identity associations in the association data structure in the memory responsive to the confidence levels of the conflicting identity associations, to identify in the intercepted data packets, second data packets transmitted over the network and containing specific network addresses of the second data packets, to associate the second data packets with respective ones of the strong identities responsively to the specific network addresses of the second data packets and the identity associations in the association data structure, and to analyze the second data packets in order to detect anomalous behavior and to attribute the anomalous behavior to the respective ones of the strong identities.

21. The apparatus according to claim 20, wherein the strong identities comprise hostnames of computers.

22. The apparatus according to claim 20, wherein the strong identities comprise usernames.

23. The apparatus according to claim 20, wherein the processor is configured to extract the first data packets involved in allocation of network addresses, and to update the association data structure responsively to the first data packets.

24. The apparatus according to claim 23, wherein the processor is configured to associate third data packets with the respective ones of the strong identities responsively to the association data structure, and to analyze the third data packets together with the second data packets in order to detect and attribute the anomalous behavior to an entity corresponding to one of the respective ones of the strong identities.

25. The apparatus according to claim 20, wherein the processor is configured to identify, for the first data packets, a protocol of the each of the first data packet, and to parse a payload of the each of the first data packets responsively to the protocol of the each of the first data packets in order to extract the two or more identities from the each of the first data packets.

26. The apparatus according to claim 25, wherein the processor is additionally configured to extract identity associations from packets according to:
 a name registration protocol;
 an authentication protocol; and
 a remote access protocol.

27. The apparatus according to claim 20, wherein the processor is configured to decide whether to attribute the second data packets to a respective entity responsively to a confidence level assigned to a respective association.

28. The apparatus according to claim 27, wherein the processor is configured to apply a timestamp to each association of the identity associations, and to reduce the confidence level in response to time that has elapsed since the timestamp.

29. The apparatus according to claim 20, wherein the processor is configured to invalidate recorded associations in response to an expiration criterion.

30. The apparatus according to claim 29, wherein the processor is configured, upon occurrence of the expiration criterion, to retroactively disassociate one or more of the second data packets that were associated with one of the respective ones of the strong identities during a predefined period prior to the occurrence of the expiration criterion.

31. The apparatus according to claim 13, wherein the processor is configured to derive from one packet an association between an Internet Protocol (IP) address and a Media Access Control (MAC) address and to derive from another packet an association between the MAC address and a hostname, and to record an identity association which associates the IP address with the hostname in the association data structure.

32. A computer software product, comprising a non-transitory computer-readable medium in which program instructions are stored, the instructions, when read by a computer, cause the computer to intercept data packets transmitted over a network, to extract from the intercepted data packets, first data packets including packets of a network address assignment protocol, packets of a network address advertisement and discovery protocol and packets of a network diagnosis and error reporting protocol, wherein each of the first data packets including two or more identities in a manner indicative that the two or more identities represent a same entity, and to record the two or more identities from the each of the first data packets, as identity associations in an association data structure forming associations between network addresses and strong identities, to assign confidence levels to the identity associations, responsive to respective protocols from which the identity associations were derived, when two or more of the identity associations conflict, to choose to record one of the conflicting identity associations responsive to the confidence levels of the conflicting identity associations, to identify in the intercepted data packets, second data packets transmitted over the network and containing network addresses of the second data packets, wherein the instructions further cause the computer to associate, responsively to the network addresses of the second data packets and the identity associations in the association data structure, the second data packets with respective ones of the strong identities, and to analyze the second data packets in order to detect anomalous behavior and to attribute the anomalous behavior to the respective ones of the strong identities.

* * * * *